United States Patent [19]

Klemann et al.

[11] Patent Number: 4,992,293

[45] Date of Patent: Feb. 12, 1991

[54] THIOESTER DERIVATIVES AS LOW CALORIE FAT MIMETICS

[75] Inventors: Lawrence P. Klemann, Somerville; John W. Finley, Whippany; Anthony Scimone, Cedar Grove, all of N.J.

[73] Assignee: Nabisco Brands, Inc., East Hanover, N.J.

[21] Appl. No.: 409,386

[22] Filed: Sep. 19, 1989

[51] Int. Cl.$^5$ .................... A23L 1/307; C07C 327/00
[52] U.S. Cl. .................... 426/611; 426/601; 426/804; 558/251; 558/255
[58] Field of Search .................. 42/601, 607, 611, 804; 558/251, 255

[56] References Cited

U.S. PATENT DOCUMENTS

| | | | |
|---|---|---|---|
| 500,048 | 5/1894 | Winter . | |
| 2,924,528 | 2/1960 | Barsky, et al. | 99/118 |
| 2,993,063 | 7/1961 | Alsop, et al. | 260/410.6 |
| 3,495,010 | 2/1970 | Fossel | 424/312 |
| 3,579,548 | 5/1971 | Whyte | 260/410.7 |
| 3,600,186 | 8/1971 | Mattson, et al. | 99/1 |
| 3,637,774 | 1/1972 | Babayan, et al. | 260/410.6 |
| 3,876,794 | 4/1975 | Rennhard | 426/152 |
| 3,818,089 | 6/1974 | Bayley, et al. | 424/9 |
| 4,005,195 | 1/1977 | Jandacek | 424/180 |
| 4,304,768 | 12/1981 | Staub et al. | 424/180 |
| 4,508,746 | 4/1985 | Hamm | 426/601 |
| 4,631,196 | 12/1986 | Zeller | 426/580 |
| 4,758,361 | 7/1988 | Krol | 252/48.6 |

FOREIGN PATENT DOCUMENTS

| | | |
|---|---|---|
| 1,106,681 | 11/1978 | Canada ................ 99/156 |
| 207,070 | 2/1984 | Fed. Rep. of Germany . |
| 3,529,564 | 3/1987 | German Democratic Rep. . |
| 205,273 | 5/1986 | European Pat. Off. . |
| 233,856 | 2/1987 | European Pat. Off. . |
| 254,547 | 7/1987 | European Pat. Off. . |
| 5,645,598 | 10/1981 | Japan . |

OTHER PUBLICATIONS

Aarsmann, A.A., et al., 5 Biorg. Chem. 241–253 (1976).
Akesson, B., et al., 23 Chem. Phys. Lip. 93–99 (1979).
Booth, A.N., et al., and Gros, A.T. 40 JAOCS 551–553 (1963).
Chemical Abstracts, vol. 110: 154750W, p. 1989.
Chemical Abstracts, vol. 84: 146814Z, p. 229, (1976).
Cox, J.W., and Horrocks, L.A., 22 J. Lip. Res. 496–505 (1981).
Debuch, H., and Seng, P., Chap. 1 of *Ether Lipids*, Academic Press 1–24 (1972).
Farrell, W.J. 8 Lipids 234–235 (1973).
Gottenbos, J.J. Chap. 8 in *Dietary Fat Requirements* AOCS, 107–112 (1988).
Goodman and Gilman's *Pharmacological Basis of Therapeutics*, 7th ed., 1002–1003 (1985).
Gronowitz, S., et al., Chem Phys. Lip. 307–321 (1978).
Hallgren, B., Chap. 15 of *Ether Lipids*, Academic Press 261–275 (1983).
Halliburton, W.D., et al., 13 JBC 301–305 (1919).
Hamm, D.J., 49 J. Food Sci. 419–428 (1984).
Haumann, B.J., 63 JAOCS 278–288
Harrocks, L.A., in *Ether Lipids*, Academic Press 177–179, 225–239 (1972).
Kurooka, S. et al., 81 J. Biochem. 361–369 (1977).
Kurooka et al., A Novel and Simple Colorimetric Assay for Human Serum Lipase, J. Biochem 81, p. 361–369, (1977).
LaBarge, R.G., et al., 42 Food Tech. 84–90 (1988).
Mangold, H.K., 18 Amg. Chem. 493–503 (1979).
Mangold, H.K., Chap 13 of *Ether Lipids*, Academic Press, 231–238 (1983).
Merten, H.L., 18 J. Ag. Ford Chem. 1002–1004 (1970).
Pitas, R.E., et al., 13 Lipids 844–849 (1978).
Renard, G., et al., 22 Lipids 539–541 (1987).
Spener, F. Chap. 14 of *Ether Lipids*, Academic Press, 239–259 (1983).
Stryker, W.A., 31 Arch. Path 670–692 (1941).

*Primary Examiner*—Donald E. Czaja
*Assistant Examiner*—Evan Federman

[57] ABSTRACT

Thiester derivatives are disclosed as fat mimetic compounds for reduced calorie food compositions. These compounds have a two- to six-carbon backbone to which are attached at least one $C_1$ to $C_{29}$ fatty aliphatic, ether, ester or thioester group in ester linkage and at least one other fatty $C_1$ to $C_{29}$ group in ester or thioester linkage. Preferred compounds have three fatty substituents attached to the backbone and are partially digestible.

52 Claims, No Drawings

THIOESTER DERIVATIVES AS LOW CALORIE FAT MIMETICS

BACKGROUND OF THE INVENTION

This invention relates to the use of thioester derivatives as edible, preferably partially digestible, synthetic fat replacements in food and pharmaceuticals. These compounds have a two- to six- carbon backbone to which is attached at least one fatty $C_1$ to $C_{29}$ aliphatic, ether, ester or thioester group in ester linkage, and at least one other fatty group in ester or in thioester linkage. Preferred structures have three fatty acid ester groups so attached.

Reduction in caloric intake can be significantly enhanced by dietary fat reduction, since fats provide nine calories per gram compared to four calories per gram provided by protein or carbohydrates. Furthermore, dietary fats represent approximately 40 to 45% of the U.S. daily caloric intake, and the percentage has risen since 1936 (Merten, H. L., 18 *J. Agr. Food Chem.* 1002 (1970)). Not only are fats high in calories, but certain fats appear to pose a health risk when consumed in large quantities over time. A number of national advisory committees on nutrition have made recommendations differing in detail, but the common theme is a reduction in the total amount of fat in the diet (Gottenbos, J. J., chapter 8 in Beare-Rogers, J., ed., *Dietary Fat Requirements in Health and Development*, A.O.C.S. 1988, page 109). Hence, major research efforts have focused on ways to produce food substances that provide the same functional and organoleptic properties as fats, but not the calories.

A major strategy for developing low calorie replacement fats has been to structurally re-engineer natural triglycerides in such a way as to retain their conventional functional properties in foods, while removing their susceptibility toward hydrolysis or subsequent absorption during digestion. To this end, the the fatty acids attached to glycerol have been replaced with alternate acids (U.S. Pat. No. 3,579,548 to Whyte); groups have been inserted between the fatty acids and the glycerol backbone ("propoxylated glycerols", Eur. Pat. Ap. No. 254,547 to White and Pollard); the ester linkages have been replaced by ether linkages (Can. Pat. No. 1,106,681 to Trost); the ester linkages have been reversed (U.S. Pat. No. 4,508,746 to Hamm); and the glycerol moeity has been replaced with an alternate alcohol (e.g., ethylene glycol in U.S. Pat. No. 2,924,528 to Barskey et al., and U.S. Pat. No. 2,993,063 to Alsop and Carr).

A second major approach to the development of a low calorie fat replacement has been to explore or synthesize nonabsorbable polymeric materials structurally unlike triglycerides, but having physical properties similar to edible fat. Mineral oil was disclosed as early as 1894 (U.S. Pat. No. 519,980 to Winter), and, more recently, polydextrose (U.S. Pat. No. 4,631,196 to Zeller), polyglucose and polymaltose (U.S. Pat. No. 3,876,794 to Rennhard), polysiloxane (Eur. Pat. Ap. No. 205,273 to Frye), jojoba wax (W. Ger. Pat. No. 3,529,564 to Anika), and polyethylene polymers (E. Ger. Pat. No. 207,070 to Mieth, et al.) have been suggested.

A third major strategy combines the first two. Rather than restructure triglyceride molecules or find a substitute structurally very dissimilar, this approach explores the use of various polyol esters, compounds which have numbers of fatty acid groups in excess of the three in conventional fat triglycerides, as nonabsorbable fat replacements. Fully esterified sugar alcohols were suggested as fat replacements during World War I (notably mannitol, Lapworth, A., and Pearson, L. K., and Halliburton, W. D., et al., 13 *J. Biol. Chem.* 296 and 301 (1919)); Minich suggested esterifying pentaerythritol, a tetrahydric neopentyl sugar alcohol which can be formed from pentaerythrose, in 1960; and the Southern and Western Regional Research Laboratories of the U.S.D.A. investigated the feasibility of using amylose esters as new-type fats during the 1960's (see Booth, A. N., and Gros, A. T., 40 *J. Amer. Oil Chem. Soc.* 551 (1963) and the references cited therein). More recently, sucrose polyesters have been suggested (U.S. Pat. No. 3,600,186 to Mattson and Volpenhein). The caloric availability and digestibility of a series of dimeric and polymeric glycerides including diglyceride esters of succinic, fumaric, and adipic acids, and polymeric fats from stearic, oleic and short-chain dibasic acids were assessed by the U.S.D.A. group cited supra, and polyglycerol esters have since been suggested (U.S. Pat. No. 3,637,774 to Babayan and Lehman).

Nondigestible or nonabsorbable triglyceride analogues, polymeric materials, and polyol esters have proved disappointing as fat replacements when tested in feeding trials, where gastrointestinal side effects occurred, in some cases so extreme that frank anal leakage was observed (for recent reviews, see Hamm, D. J., 49 *J. Food Sci.* 419 (1984), Haumann, B. J., 63 *J. Amer. Oil Chem. Soc.* 278 (1986), and LaBarge, R. G., 42 *Food Tech.* 84 (1988)). Nondigestible fats act as a laxative and are expelled from the body, eliciting foreign body reactions like those early documented for mineral oil (Stryker, W. A., 31 *Arch. Path.* 670 (1941), more recently summarized in Goodman and Gilman's *Pharmacological Basis of Therapeutics*, 7th ed., Macmillan Pub. Co., N.Y. 1985, pp. 1002-1003). Polyglycerol and polyglycerol esters, for example, suggested as fat replacements supra, have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, or incorporating saturated fatty groups, Eur. Pat. Ap. No. 233,856 to Bernhardt), and dietary fiber preparations have been incorporated into polysaccharide and/or polyol-containing foodstuffs to help inhibit the diarrheal effect (U.S. Pat. No. 4,304,768 to Staub et al.).

SUMMARY OF THE INVENTION

An object of the present invention is to provide a new group of fat replacement compounds, members of which are more compatible with normal digestion. More particularly, it is an object of a preferred embodiment of the present invention to provide a more digestible fat replacement which interferes less with fat metabolism, thus avoiding diarrhea and other laxative side effects. It is a further object of a preferred embodiment of the present invention to provide a partially digestible fat replacement which may, if desired, be engineered to provide essential or desirable fatty acids.

These and other objects are accomplished by the present invention, which describes thio ester derivatives comprising a new class of edible synthetic fat replacements for food and pharmaceuticals. These compounds have a two- to six- carbon backbone to which is attached at least one fatty $C_1$ to $C_{29}$ aliphatic, ether, ester or thioester group in ester linkage, and at least one other fatty group in ester or thioester linkage, and may be described by the formula:

$$(R-\overset{\overset{O}{\|}}{C}-O)_m-(B)-(S-\overset{\overset{O}{\|}}{C}-R)_n$$

where:

B is a linear or branched alkyl backbone having from 2 to 6 carbons, m=1 to 6, n=0 to 3, and R is, independently, an aliphatic, ether, ester or thioester group having 1 to 29 carbon atoms, with the proviso that $m+n \geq 2$, and that each compound has at least one thioester bond.

Preferred structures have $m+n=3$ and are partially digestible.

DETAILED DESCRIPTION OF THE INVENTION

Glycerol thioethers have been isolated in minute quantities from mammalian heart tissue (at reported levels of 0.09 micromoles per 100 mg tissue lipid in humans; Ferrell, W. J., 8 *Lipids* 234 (1973)). The biochemistry and function of these derivatives has not been elucidated, but their glycerol ether counterparts have been studied in considerable detail. First discovered in 1922 in an unsaponifiable fraction of shark liver oil and detected histochemically in tissue slices about the same time (for an historical review, see Debuch, H., and Seng, P., chapter I of Snyder, F., ed., *Ether Lipids, Chemistry and Biology*, Academic Press, N.Y., 1972, pages 1-24), glyceryl ethers have since been found to occur as ubiquitous constituents of human and animal tissues, and of a great variety of microorganisms (for distributions, see Horrocks, L. A., chapter IX, pages 177-179 and 225-239, *Ether Lipids, Chemistry and Biology* cited supra, and Mangold, H. K., and Paltauf, F., eds., *Ether Lipids, Biochemical and Biomedical Aspects*, Academic Press, New York, 1983, pages 231-238). Glyceryl ethers seem to have a role in synthetic processes, possibly as structural components; phosphorylated glyceryl ethers are components of membranes (see Horrocks, cited supra, and Hallgren, B., Chapter 15 of *Ether Lipids, Biochemical and Biomedical Aspects*, supra, pages 261-275).

Mono-, di- and tri-alkyl glycerols are isosteric to their corresponding acylglycerols and have been used as model substances in studies of intestinal fat absorption. They are not attacked by the hydrolyzing enzymes usually associated with digestion; instead, they seem to be either catabolized via alternate metabolic pathways or not metabolized at all (Pitas, R. E., et al., 13 *Lipids* 844 (1978); Mangold, H. K., 18 *Angew. Chemie* (Internat. Ed.) 493 (1979); and Spener, F., Chapter 14 in *Ether Lipids, Biochemical and Biomedical Aspects*, supra, pages 239-259). Because of their biochemical properties, glyceryl ethers have been synthesized for use as fat absorption indicators (U.S. Pat. No. 3,818,089 to Bayley and Carlson).

Unlike glycerol thioethers, glycerol thioesters do not appear to be natural constituents of lipids, but have been synthesized for use as lipase (acylglycerol hydrolase) substrates in a spectrophotometric measure of enzyme activity (Aarsman, A. J., et al., 5 *Bioorg. Chem.* 241 (1976); Kurooka, S., et al. 81 *J. Biochem.* 361 (1977); and Renard, G., et al., 1985 *Proc. World Conf. Emerging Technol. Fats Oils Ind.* 343). The thiol produced by the enzymatic hydrolysis of fatty acid thioesters can be reacted with Ellmann reagent (5,5'dithiobis (2-nitrobenzoic acid), referred to as "DTNB") to yield a yellow color:

$$R-S-\overset{\overset{O}{\|}}{C}-R' \xrightarrow[\text{water}]{\text{lipase}} R-SH + R'-COOH$$

$$R-SH + DTNB \longrightarrow \text{yellow color at 412 nm}$$
$$(\text{epsilon} = 14800 \text{ M}^{-1})$$

The method was patented in 1981 by the Dainippon Pharmaceutical Co. (Jap. Pat. No. 81,045,598) and was subsequently improved by a modification of the solvent system (Renard, G., et al. 22 *Lipids* 539 (1987)). A similar enzyme assay has been suggested using 4,4'-dithiobispyridine (referred to as "DTP") to react with thiol instead of DTNB (Cox, J. W., and Horrocks, L. A., 22 *J. Lipid Res.* 496 (1981)).

Acylthioglycerols, including radioactively labelled trioleoyl-thioglycerol, have been synthesized for use in studying the mechanism of lipase action and metabolic studies of enantiomeric acylglycerols (Akesson, B., et al. 23 *Chem. Phys. Lipids* 93 (1979)). Because thioglycerol derivatives exhibit higher optical rotations than the corresponding acylglycerol derivatives, the chiroptical properties (ORD and CD) of the thioglycerols have been used to assess lipase stereospecificity (Gronowitz, S., et al., 22 Chem. Phys. Lipids 307 (1978). In thoracic duct cannulation of rats, trioleoylthioglycerol (alone or together with trioleoylglycerol) exhibited a tenth to a twentieth the amount of accumulation in chyle lipids than that observed with triacylglycerol; the investigators thought this occurred, not because of decreased digestion by lipase, but because of low utilization of 2-acylthioglycerol for chyle lipid resynthesis (Akeson, et al., supra, page 98).

This invention is based upon the surprising finding that, contrary to the reportedly efficacious employment of thioglycerol derivatives as lipase substrates, thioglycerol derivatives are mediocre or poor lipase substrates. Our studies have shown, for example, that 1-thioglycerol trioleate is hydrolyzed 50% in a three hour incubation with a pancreatic lipase preparation that hydrolyzed triolein completely in ten minutes (see Example 15 infra). 1,2-Dithioglycerol trioleate was a poorer substrate than the mono derivative, exhibiting hydrolysis of only 30 to 40% in a three-hour incubation.

We have found that thioester derivatives heretofore suggested as substrates for lipase assays, and their analogues, are suitable as low calorie fat mimetics. The thioester derivatives of this invention comprise compounds having the following general formula:

$$(R-\overset{\overset{O}{\|}}{C}-O)_m-(B)-(S-\overset{\overset{O}{\|}}{C}-R)_n$$

where:

B is a linear or branched alkyl backbone having from 2 to 6 carbons, m=1 to 6, n=0 to 3, and each R is, independently, a $C_1$ to $C_{29}$ aliphatic group, a $C_2$ to $C_{29}$ ether group of the formula R'—O—R"—, a $C_2$ to $C_{29}$ ester group of the formula

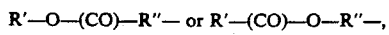

or a $C_2$ to $C_{29}$ thioester group of the formula

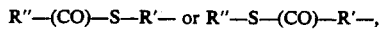

where R'— and R"— are, independently, aliphatic groups, with the proviso that $m+n \geq 2$, and that each compound has at least one thioester bond.

The compounds of this invention have an alkyl backbone, B, derived from a polyol or a thiol, to which are attached at least one fatty aliphatic, ether, ester, or thioester group having 1 to 29 carbons in ester linkage and at least one fatty aliphatic, ether, ester or thioester group having 1 to 29 carbons in thioester or ester linkage. Thus, this invention comprises acylated polyols or thiols having 2 to 6 fatty groups, provided that each compound has at least one thioester. While the minimum number of fatty groups, $m+n$, is always 2 and the maximum can be as high as 6, preferred compounds of this invention have $m+n=3$ or 4, i.e., those having three or four fatty groups.

Examples of polyols or thiols forming the compound backbones are glycol and thioglycol; glycerol and mono or dithioglycerol; butanediol, butanetriol, butanetetrol, and their thiol counterparts, such as mercaptobutanol, dimercaptobutanol, mercaptobutanediol, dimercaptobutanediol; pentanediol, pentanetriol, pentanetetrol, and their thiol counterparts, such as mercaptopentanol, mercaptopentanediol, dimercaptopentanol, and dimercaptopentanediol; hexanediol, hexanetriol, and hexanetetrol and their thiol counterparts, such as mercaptohexanol, mercaptohexanediol, dimercaptohexanol, dimercaptohexanediol; sorbitol and thiosorbitol. The polyols and thiols may be linear or branched, saturated or unsaturated, with hydroxyl or thiol substituents vicinal or distal, or attached to the same carbon atom. Thus, this invention additionally encompasses, for example, neoalkyl derivatives such as tris-hydroxymethylethane, trishydroxymethylpropane, and pentaerythritol, and their thiol counterparts. Chemical descriptions and formulae used here include isomeric variations.

The fatty groups R may be the same or different, and may comprise a mixture of substituents. R groups may be aliphatic groups, derived from an aliphatic hydrocarbon having from 1 to 29 carbons by the removal of one hydrogen; $C_2$ to $C_{29}$ ether groups of the formula R'—O—R"—, where R' and R" are aliphatic groups; $C_2$ to $C_{29}$ ester groups of the formula R'—(CO)—O—R"— or R'—O—(CO)—R"—, where R' and R" are aliphatic groups; or $C_2$0 to $C_{29}$ thioester groups of the formula R"—(CO)—S—R'— or R"—S—(CO)—R'—, where R' and R" are aliphatic groups.

Where R groups are aliphatic, they may be derived from fatty acids. The term "fatty acid" used here means an organic fatty acid of the formula R'COOH containing 2 to 30 carbons, and may be synthetic or natural, saturated or unsaturated, with straight or branched chains. Examples of fatty acids are acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids. Mixtures of fatty acids may also be used, for example, those derived from nonhydrogenated, partially hydrogenated or hydrogenated oils such as soybean, safflower, sunflower, sesame, peanut, corn, olive, rice bran, canola, babassu nut, coconut, palm, palm kernel, lupin, nasturtium seed, mustard seed, cottonseed, low erucic rapeseed, butter or marine oils, or from plant waxes such as jojoba. Specific fractions of natural or processed oils may also be used.

R may also be an ester group of the formula R'—(CO)—O—R" or R'—O—(CO)—R"—, where R' and R" are aliphatic groups, provided that the sum of the number of carbons in R' and R" be 2 to 29. Note that when R is a fatty ester group, the ester bond may be in either direction (—O—(CO)— or —(CO)—O—) with respect to the backbone.

Thus, R may be an ester derivative such as a dicarboxylate-extended fatty group. By "dicarboxylate-extended" fatty group is meant a group formed from the reaction of fatty alcohols with dicarboxylic acids, such as, for example, malonic, succinic, glutaric or adipic acid. The resulting malonyl, succinyl, glutaryl or adipoyl fatty groups are, structurally, aliphatic alcohols with their chains extended by the radicals —OC—CH$_2$—CO— (malonyl), —OC—(CH$_2$)$_2$—CO— (succinyl), —OC—(CH$_2$)$_3$—CO— (glutaryl), —OC—(CH$_2$)$_4$—CO— (adipoyl), and the like. Thus, if a fatty alcohol is denoted by R"OH, a malonyl- (or malonate-extended) fatty R group would be R"—O—(CO)—CH$_2$—, a succinyl- (or succinate-extended) R group would be R"—O—(CO)—(CH$_2$)$_2$—, a glutaryl- (or glutarate-extended) R group would be R"—O—(CO)—(CH$_2$)$_3$—, and so forth.

R may also an ester group that is a derivative of an acylated hydroxycarboxylic acid, with the ester bond in the side chain reversed as compared to dicarboxylate-extended groups. The resulting fatty groups are, structurally, fatty acids extended by hydroxycarboxylic acids or acylated hydroxy fatty acids. Thus, the hydroxyl group of an acid in the lactic acid series, glycolic acid (hydroxyacetic, CH$_2$OH—COOH) or hydracrylic (3-hydroxypropionic, CH$_2$OH—CH$_2$COOH) may be acylated with a fatty acid (R"COOH) to yield an ester R group of the formula R"—(CO)—O—CH$_2$— (glycolic-extended), R"—(CO)—O—CH$_2$—CH$_2$— (hydracrylic-extended), and so forth. Any isomer of any hydroxycarboxylic acid may be used with any fatty acid, so long as the sum of the carbons in hydroxycarboxylic and fatty acid portions of the R group is less than or equal to 29. This type of ester R group may also be formed by acylating the hydroxyl group of an hydroxy fatty acid such as ricinoleic acid.

R may also be a thioester group of the formula R"—(CO)—S—R'— or R"—S—(CO)—R'—, where R' and R" are as defined above, provided that the sum of the number of carbons in R' and R" be 2 to 29. Note that, as in the case of ester groups, R may be a fatty group having a thioester bond in either direction. Thus, R may be formed from the reaction between dicarboxylic acids, such as, for example, malonic or succinic acid, and fatty thiols of the formula R"SH to yield malonyl R derivatives of the formula R"—S—(CO)—CH$_2$—, succinyl derivatives of the formula R"—S—(CO)—(CH$_2$)$_2$—, and so forth as described for dicarboxylate-extended fatty alcohols above. R may also be a derivative of a mercaptocarboxylic acid such as thioglycolic acid (HS—CH$_2$—COOH) reacted with a fatty acid of the formula R"COOH to yield an R group of the formula R"—(CO)—S—CH$_2$—, with the thioester bond reversed as compared to the dicarboxylic acid derivative as described above for ester R groups.

R may also be an ether group of the formula R'O—R"— having 2 to 29 carbon atoms with R' and R" as defined above, that is, an oxaaliphatic chain having an ether group (—O—) anywhere in the chain. The aliphatic chain may be linear or branched, saturated or unsaturated. Ether R derivatives may be derived by using etheric carboxylic acids as acylating agents.

Where R is a thioester group, n in the general formula above may be 0, but m must then be at least 2. Thus, this invention includes two types of thioester derivatives. The first type comprises compounds which have at least one fatty group R attached in ester linkage to backbone B and at least one second fatty group R attached in thioester linkage, with B and R as defined above. This group has at least one m and at least one n. The second type of thioester derivative comprises compounds which have at least one fatty group R attached in ester linkage to backbone B and at least one second C$_1$ to C$_{29}$ thioester group attached in ester linkage, with B and R as defined above. This group has at least two m and no n. Both types comprise structures having at least one thioester bond per molecule.

The R groups will be selected to provide a discernible fatty character in the compounds. Thus, most of the R groups have 3 or more carbon atoms, with a percentage containing 3 to 23 (which may be derived from acids having 4 to 24 carbons), more narrowly 9 to 19, and even more narrowly, 15 to 17 carbons (derived from acids having 16 to 18 carbons). Preferred thioesters can have an array of R groups, selected to include 95% having 13 to 17 carbons (derived from acids having 14 to 18 carbons). In one embodiment, the R groups are in the range of 13 to 17 carbon atoms and predominantly saturated. In another embodiment, the R groups are in the range of 15 to 17 carbon atoms and predominantly unsaturated (with a preponderance of monounsaturated moeities).

The choice, number and arrangement of R groups attached to the backbone B will affect the biological as well as physical properties of the compound. Where, by virtue of any of these factors, the R groups are metabolized, the caloric value of the compound will increase. Among the preferred compounds are those which are partially digestible and would contribute 0.5 to 8.5 kcal/gram, more narrowly 1.0 to 6.0 kcal/gram, upon being metabolized. For some applications, compounds having approximately a third or less of the calories of natural triglyceride fat are particularly desirable.

Thus, in the preferred class of compounds, the R groups exhibit differential reactivity on digestion. This results not only in the controlled and limited availability of effective caloric value, but also the selective conversion of the fat mimetic to a product or intermediate with a less oil-like nature. The product of such a controlled digestive process may be said to have decreased hydrophobicity, and correspondingly increased hydrophilicity, relative to its fat mimetic precursor. Such a product of a process of controlled digestion would tend to have not only decreased oiliness, but also increased ability to function as an emulsifier. Such a controlled digestion product will be less prone to exist in the GI tract as a persistent oil compared with substances taught in the prior art. Ideally, the enhanced emulsifying capacity of the enzymatic cleavage product derived from compositions of the invention would actually be an aid to digestion, substantially overcoming a major problem which has heretofore limited the widespread use and development of highly desirable low calorie synthetic fats and oils in foods and food preparation.

The more readily digestible residue can be a highly desirable essential acid or a nutritionally advantageous carboxylic acid such as oleic, linoleic, linolenic, or eicosapentaenoic acids, as well as low molecular weight carboxylic acids (e.g., acetic, propionic, or butyric acids) which would limit caloric delivery and provide additional ability to control functionality. As with natural triglycerides, the more readily digestible substituent can be a fatty acid having beneficial attributes such as, for example, those associated with conjugated linoleic acid isomers.

The thioester derivatives of this invention may be incorporated either alone, or in combination with another fat and/or fat mimetic, into any food composition or used in conjunction with any edible material. The term "edible material" is broad and includes anything edible whether or not intended for nutrition, i.e., it can be an additive such as an antioxidant for fats or oils, and antispatter agent, and emulsifier, a chewing gum or coating component, a cosmetic ingredient, or other minor functional ingredient. Representative of edible materials which can contain the thioesters of this invention in full or partial replacement of natural fat are: frozen desserts, e.g., sherbet, ice cream, ices, or milk shakes; puddings and pie fillings; margarine substitutes or blends; flavored bread or biscuit spreads; mayonnaises and mustards; salad dressings; filled dairy products such as filled cream or filled milk; dairy or nondairy cheese spreads; coffee lighteners, liquid and dried; flavored dips; frying fats and oils; reformed and comminuted meats; meat substitutes or extenders; pet foods; whipped toppings; compound coatings; frostings and fillings; cocoa butter replacements or blends; candy, especially fatty candies such as those containing peanut butter or chocolate; chewing gum; bakery products, e.g., cakes, breads, rolls, pastries, cookies, biscuits, and savory crackers; mixes or ingredient premixes for any of these; breakfast cereals; as well as flavor, nutrient, drug or functional additive delivery systems.

The following is a list of representative, but not limiting, compounds of this invention:

(A) Compounds with at least one R attached in ester linkage to backbone B and at least one second R attached in thioester linkage to the backbone, where R and B are as defined above. Examples of this type of thioester compound include:

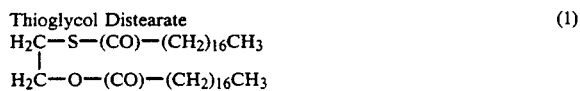

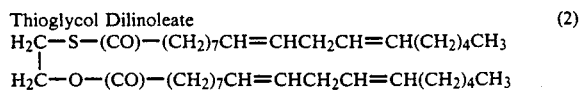

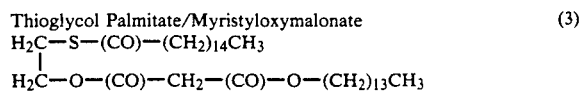

-continued

1-Thioglycerol Trioleate (4)
$$H_2C-S-(CO)-(CH_2)_7CH=CH(CH_2)_7CH_3$$
$$CH-O-(CO)-(CH_2)_7CH=CH(CH_2)_7CH_3$$
$$H_2C-O-(CO)-(CH_2)_7CH=CH(CH_2)_7CH_3$$

1-Thioglycerol Tristearate (5)
$$H_2C-S-(CO)-(CH_2)_{16}CH_3$$
$$CH-O-(CO)-(CH_2)_{16}CH_3$$
$$H_2C-O-(CO)-(CH_2)_{16}CH_3$$

1-Thioglycerol Tripalmitate (6)
$$H_2C-S-(CO)-(CH_2)_{14}CH_3$$
$$CH-O-(CO)-(CH_2)_{14}CH_3$$
$$H_2C-O-(CO)-(CH_2)_{14}CH_3$$

1-Thioglycerol Trimyristate (7)
$$H_2C-S-(CO)-(CH_2)_{12}CH_3$$
$$CH-O-(CO)-(CH_2)_{12}CH_3$$
$$H_2C-O-(CO)-(CH_2)_{12}CH_3$$

1-Thioglycerol Trilaurate (8)
$$H_2C-S-(CO)-(CH_2)_{10}CH_3$$
$$CH-O-(CO)-(CH_2)_{10}CH_3$$
$$H_2C-O-(CO)-(CH_2)_{10}CH_3$$

1-Thioglycerol Dilaurate/Palmitate (9)
$$H_2C-S-(CO)-(CH_2)_{14}CH_3$$
$$CH-O-(CO)-(CH_2)_{10}CH_3$$
$$H_2C-O-(CO)-(CH_2)_{10}CH_3$$

2-Thioglycerol Trioleate (10)
$$H_2C-O-(CO)-(CH_2)_7CH=CH(CH_2)_7CH_3$$
$$CH-S-(CO)-(CH_2)_7CH=CH(CH_2)_7CH_3$$
$$H_2C-O-(CO)-(CH_2)_7CH=CH(CH_2)_7CH_3$$

2-Thioglycerol Tripalmitate (11)
$$H_2C-O-(CO)-(CH_2)_{14}CH_3$$
$$CH-S-(CO)-(CH_2)_{14}CH_3$$
$$H_2C-O-(CO)-(CH_2)_{14}CH_3$$

2-Thioglycerol Dioleate/Stearate (12)
$$H_2C-O-(CO)-(CH_2)_7CH=CH(CH_2)_7CH_3$$
$$CH-S-(CO)-(CH_2)_7CH=CH(CH_2)_7CH_3$$
$$H_2C-O-(CO)-(CH_2)_{16}CH_3$$

1,2-Dithioglycerol Trioleate (13)
$$H_2C-S-(CO)-(CH_2)_7CH=CH(CH_2)_7CH_3$$
$$CH-S-(CO)-(CH_2)_7CH=CH(CH_2)_7CH_3$$
$$H_2C-O-(CO)-(CH_2)_7CH=CH(CH_2)_7CH_3$$

1,2-Dithioglycerol Trilaurate (14)
$$H_2C-S-(CO)-(CH_2)_{10}CH_3$$
$$CH-S-(CO)-(CH_2)_{10}CH_3$$
$$H_2C-O-(CO)-(CH_2)_{10}CH_3$$

1,2-Dithioglycerol Tripalmitate (15)
$$H_2C-S-(CO)-(CH_2)_{14}CH_3$$
$$CH-S-(CO)-(CH_2)_{14}CH_3$$
$$H_2C-O-(CO)-(CH_2)_{14}CH_3$$

-continued 1,2-Dithioglycerol Trimyristate (16)
$$H_2C-S-(CO)-(CH_2)_{12}CH_3$$
$$CH-S-(CO)-(CH_2)_{12}CH_3$$
$$H_2C-O-(CO)-(CH_2)_{12}CH_3$$

1,2-Dithioglycerol Myristate/Palmitate/Laurate (17)
$$H_2C-S-(CO)-R$$
$$CH-S-(CO)-R,$$
$$H_2C-O-(CO)-R$$

where the R groups are a 1:1:1 mixture of
$-(CH_2)_{12}CH_3$, $-(CH_2)_{14}CH_3$, and
$-(CH_2)_{10}CH_3$ residues 1,3-Dithioglycerol Trioleate (18)
$$H_2C-S-(CO)-(CH_2)_7CH=CH(CH_2)_7CH_3$$
$$CH-O-(CO)-(CH_2)_7CH=CH(CH_2)_7CH_3$$
$$H_2C-S-(CO)-(CH_2)_7CH=CH(CH_2)_7CH_3$$

1,3-Dithioglycerol Tristearate (19)
$$H_2C-S-(CO)-(CH_2)_{16}CH_3$$
$$CH-O-(CO)-(CH_2)_{16}CH_3$$
$$H_2C-S-(CO)-(CH_2)_{16}CH_3$$

1,3-Dithioglycerol Triethoxypalmitate (20)
$$H_2C-S-(CO)-(CH_2)_{15}-O-CH_2CH_3$$
$$CH-O-(CO)-(CH_2)_{15}-O-CH_2CH_3$$
$$H_2C-O-(CO)-(CH_2)_{15}-O-CH_2CH_3$$

3-Thioglycerol Trilauryloxysuccinate (21)
$$H_2C-S-(CO)-(CH_2)_2-(CO)-O-(CH_2)_{11}CH_3$$
$$CH-O-(CO)-(CH_2)_2-(CO)-O-(CH_2)_{11}CH_3$$
$$H_2C-O-(CO)-(CH_2)_2-(CO)-O-(CH_2)_{11}CH_3$$

Soybean 2-Thioglycerol Derivative (22)
$$H_2C-O-(CO)-R$$
$$CH-S-(CO)-R$$
$$H_2C-O-(CO)-R$$
where the R groups are derived from soybean oil 1,3-Dithiobutanediol Tetraoleate (23)
$$H_2C-S-(CO)-(CH_2)_7CH=CH(CH_2)_7CH_3$$
$$CH-O-(CO)-(CH_2)_7CH=CH(CH_2)_7CH_3$$
$$CH-S-(CO)-(CH_2)_7CH=CH(CH_2)_7CH_3$$
$$H_2C-O-(CO)-(CH_2)_7CH=CH(CH_2)_7CH_3$$

3-Thiobutanol Dipelargonate (24)
$$H_2C-O-(CO)-(CH_2)_7CH_3$$
$$CH_2$$
$$CH-S-(CO)-(CH_2)_7CH_3$$
$$CH_3$$

2-Thiopentane-1,5-diol Tribehenate (25)
$$H_2C-O-(CO)-(CH_2)_{20}CH_3$$
$$CH-S-(CO)-(CH_2)_{20}CH_3$$
$$(CH_2)_2$$
$$H_2C-O-(CO)-(CH_2)_{20}CH_3$$

-continued 1,5-Dithiopentane-2,3,4-triol Pentalaurate (26)
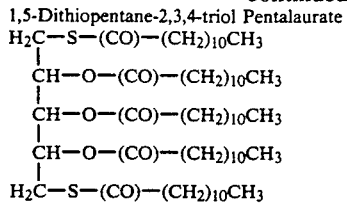

-continued

Corn Oil Thiosorbitol Derivative (27)
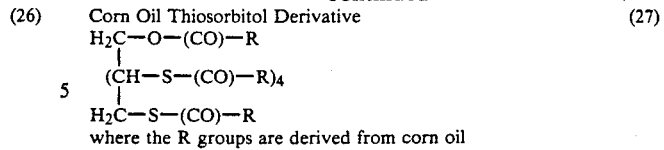
where the R groups are derived from corn oil (B) Compounds with at least one R attached in ester linkage to backbone B and at least one thioester R group attached in ester linkage to the backbone, where R and B are as defined in the general formula supra. A representative, but not limiting, group of example structures illustrating this type of thioester fat mimetic includes:

Glycerol Trimalonylmercaptolaurate (28)
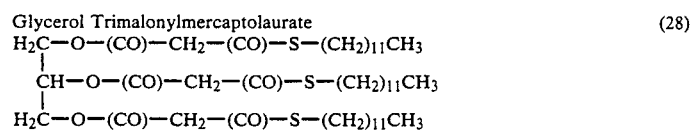

1,2,4-Butanetriol Trisuccinylmercaptocaprylate (29)
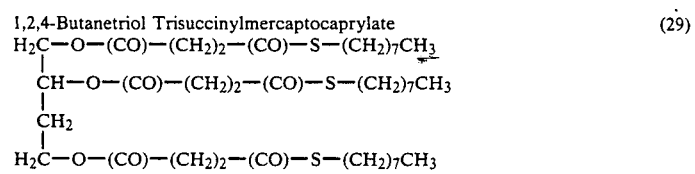

Trithioglycolated Glycerol Trioleate (30)
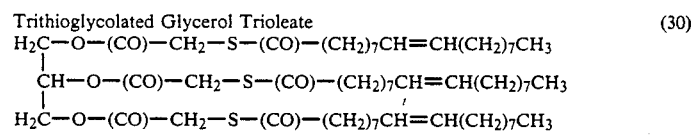

Trithioglycolated Tris-hydroxymethylpropane Trilaurate (31)
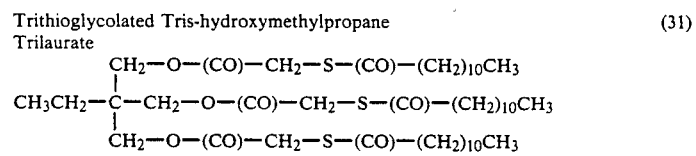

Trithioglycolated Tris-hydroxymethylpropane Triundec-10-enate (32)
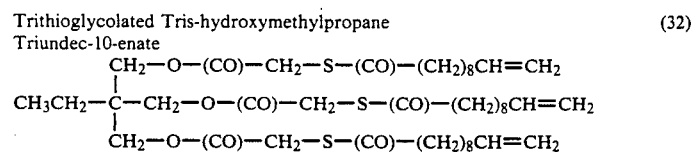

Trithioglycolated Tris-hydroxymethylpropane Tristearate (33)
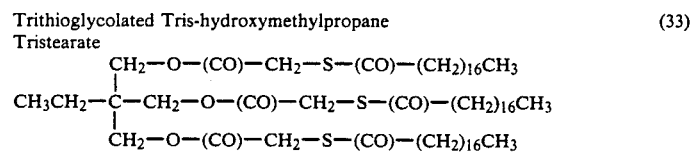

Trithioglycolated Tris-hydroxymethylpropane Tripalmitate (34)
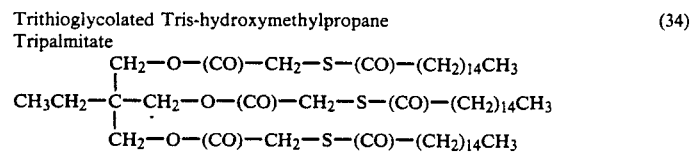

Trithioglycolated Tris-hydroxymethylpropane Trimyristate (35)
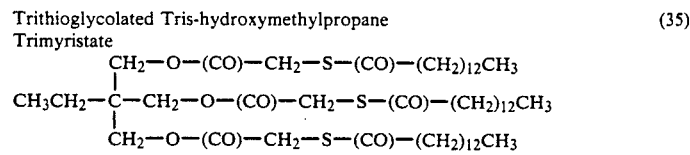

-continued

Trithioglycolated Tris-hydroxymethylpropane Dimyristate/Stearate (36)

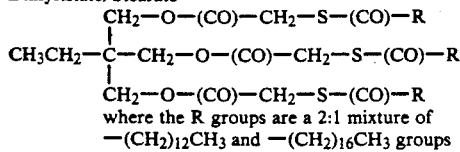

where the R groups are a 2:1 mixture of
—(CH$_2$)$_{12}$CH$_3$ and —(CH$_2$)$_{16}$CH$_3$ groups Tetrathioglycolated Pentaerythritol Tetraoleate (37)

H$_2$C—O—(CO)—CH$_2$—S—(CO)—(CH$_2$)$_7$CH=CH(CH$_2$)$_7$CH$_3$
  |
  C(—CH$_2$—O—(CO)—CH$_2$—S—(CO)—(CH$_2$)$_7$CH=CH(CH$_2$)$_7$CH$_3$)$_2$
  |
H$_2$C—O—(CO)—CH$_2$—S—(CO)—(CH$_2$)$_7$CH=CH(CH$_2$)$_7$CH$_3$

Hexathioglycolated Sorbitol Hexaoleate (38)

H$_2$C—O—(CO)—CH$_2$—S—(CO)—(CH$_2$)$_7$CH=CH(CH$_2$)$_7$CH$_3$
  |
  (CH$_2$—O—(CO)—CH$_2$—S—(CO)—(CH$_2$)$_7$CH=CH(CH$_2$)$_7$CH$_3$)$_4$
  |
H$_2$C—O—(CO)—CH$_2$—S—(CO)—(CH$_2$)$_7$CH=CH(CH$_2$)$_7$CH$_3$

Pentaerythritol Tetramalonylmercaptomyristate (39)

H$_2$C—O—(CO)—CH$_2$—(CO)—S—(CH$_2$)$_{13}$CH$_3$
  |
  C(—CH$_2$—O—(CO)—CH$_2$—(CO)—S—(CH$_2$)$_{13}$CH$_3$)$_2$
  |
H$_2$C—O—(CO)—CH$_2$—(CO)—S—(CH$_2$)$_{13}$CH$_3$ 1,3,5-Pentanetriol Trisuccinylmercapto Corn Oil Derivative (40)

H$_2$C—O—(CO)—(CH$_2$)$_2$—(CO)—S—R
  |
  CH$_2$
  |
  CH—O—(CO)—(CH$_2$)$_2$—(CO)—S—R
  |
  CH$_2$
  |
H$_2$C—O—(CO)—(CH$_2$)$_2$—(CO)—S—R where the R groups are derived from corn oil Trithioglycolated Glycerol Trioleate (30)

H$_2$C—O—(CO)—CH$_2$—S—(CH$_2$)$_7$CH=CH(CH$_2$)$_7$CH$_3$
  |
  CH—O—(CO)—CH$_2$—S—(CH$_2$)$_7$CH=CH(CH$_2$)$_7$CH$_3$
  |
H$_2$C—O—(CO)—CH$_2$—S—(CH$_2$)$_7$CH=CH(CH$_2$)$_7$CH$_3$

EXAMPLES

The following examples are presented to further illustrate and explain the present invention and should not be taken as limiting in any regard. Unless otherwise indicated, all parts and percentages are by weight, and are based on the weight at the particular stage of the processing being described. The proton nmr spectra have assigned chemical shifts, multiplicities, and intensities consistent with the structures with which they are reported.

EXAMPLE 1

1-Thioglycerol trioleate, a thio ester derivative of this invention, is synthesized in this example.

To a solution of 3-mercapto-1,2-propanediol (0.83 mL, 0.01 mole) in 10 mL of pyridine is added 10 mL (ca. 0.03 mole) oleoyl chloride and the mixture produced is shaken overnight at ambient temperature. The mixture is then filtered, and the filtrate concentrated on the rotary evaporator and finally refiltered to give the title compound as an oil.

Proton nmr spectrum in chloroform-d: chemical shift in ppm (multiplicity, intensity, assignment): 5.35 (multiplet, 6 H, HC=CH), 5.14 (quintet, 1 H, methine proton), 4.28 (doublet of doublets J=3.7 Hz, 1 H, half of O=C—O—CH$_2$), 4.11 (doublet of doublets J=5.8 Hz, 1 H, half of O=C—O—CH$_2$), 3.25 (doublet of doublets, J=5.3 Hz, 1 H, half of O=C—S—CH$_2$), 3.05 (doublet of doublets, J=6.3 Hz, 1 H, half of O=C—S—CH$_2$), 2.55 (triplet, 2 H, S—C(=O)—CH$_2$), 2.31 and 2.28 (triplets, 4 H, O—C(=O)CH$_2$), 2.02 (multiplet, 12 H, C=C—CH$_2$), 1.62 (multiplet, 6 H, O=C—C—CH$_2$), 1.30 (multiplet, 60 H, CH$_2$) and 0.87 (triplet, 9 H, CH$_3$).

EXAMPLE 2

1,2-Dithioglycerol trioleate, a dithio ester derivative of this invention, is prepared in this example.

To a solution of 2,3-dimercaptopropan-1-ol (1 mL, 0.01 mole) in 28 mL pyridine is added 11 mL oleoyl chloride. After shaking overnight at ambient temperature the mixture is filtered through the short column (5×3.8 cm diameter) of 60 micron silica gel, eluting with 100 mL pentane. The filtrate is concentrated (rotary evaporator, 100° C., 100 torr) and then filtered through a 0.45 micron filter to afford a light brown oil.

Proton nmr spectrum in chloroform-d: chemical shift in ppm (multiplicity, intensity, assignment): 5.35 (multiplet, 6 H, HC=CH), 4.21 (AB heptet, 2 H, O=C—O—CH$_2$), 3.90 (quintet, 1 H, methine proton), 3.29 (doublet of doublets, 1 H, half of S—CH$_2$), 3.15 (doublet of doublets, 1 H, half of S—CH$_2$), 2.55 and 2.54 (overlapping triplets, 4 H, S—C(=O)—CH$_2$), 2.32 (multiplet, 2 H, O—C(=O)—CH$_2$), 2.01 (multiplet, 12 H, C=C—CH$_2$), 1.65 (multiplet, 6 H, O=C—C—CH$_2$), 1.30 (multiplet, 60 H, CH$_2$) and 0.87 (triplet, 9 H, CH$_3$).

EXAMPLE 3

1-Thioglycerol tristearate, another thio ester derivative of this invention, is synthesized in this example.

To a solution of 3-mercapto-1,2-propanediol (0.83 mL, 0.01 mole) in 10 mL of pyridine is added 9.09 g (0.03 mole) of stearoyl chloride and the mixture produced is shaken overnight at ambient temperature. The mixture is then filtered, and the filtrate concentrated on the rotary evaporator and finally refiltered through basic alumina to yield the title compound.

EXAMPLE 4

1-Thioglycerol tripalmitate, another thio ester derivative of this invention, is synthesized in this example.

To a solution of 3-mercapto-1,2-propanediol (0.83 mL, 0.01 mole) in 10 mL of pyridine is added 8.25 g (0.03 mole) of palmitoyl chloride and the mixture produced is shaken overnight at ambient temperature. The mixture is then filtered, and the filtrate concentrated on the rotary evaporator and finally refiltered through basic alumina to yield the title compound.

EXAMPLE 5

1-Thioglycerol trimyristate, another thio ester derivative of this invention, is synthesized in this example.

To a solution of 3-mercapto-1,2-propanediol (0.83 mL, 0.01 mole) in 10 mL of pyridine is added 7.41 g (0.03 mole) of myristoyl chloride and the mixture produced is shaken overnight at ambient temperature. The mixture is then filtered, and the filtrate concentrated on the rotary evaporator and finally refiltered through basic alumina to yield the title compound.

EXAMPLE 6

1-Thioglycerol trilaurate, another thio ester derivative of this invention, is prepared in this example.

To a solution of 3-mercapto-1,2-propanediol (0.83 mL, 0.01 mole) in 10 mL of pyridine is added 6.57 g (0.03) mole of lauroyl chloride and the mixture produced is shaken overnight at ambient temperature. The mixture is then filtered, and the filtrate concentrated on the rotary evaporator and finally refiltered through basic alumina to yield the title compound.

EXAMPLE 7

1,2-Dithioglycerol trilaurate, a dithio ester compound of this invention, is prepared in this example.

To a solution of 2,3-dimercaptopropan-1-ol (1 mL, 0.01 mole) in 25 mL of pyridine is added 6.57 g (0.03 mole) of lauroyl chloride. After shaking overnight at ambient temperature the mixture is filtered, concentrated and refiltered through alumina to afford the title compound.

EXAMPLE 8

1,2-Dithioglycerol tripalmitate, another thio ester derivative of this invention, is prepared in this example.

To a solution of 2,3-dimercaptopropan-1-ol (1 mL, 0.01 mole) in 25 mL of pyridine is added 8.25 g (0.03 mole) of palmitoyl chloride. After shaking overnight at ambient temperature the mixture is filtered, concentrated and refiltered through a alumina to afford the title compound.

EXAMPLE 9

1,2-Dithioglycerol trimyristate, another thio ester derivative of this invention, is prepared in this example.

To a solution of 2,3-dimercaptopropan-1-ol (1 mL, 0.01 mole) in 25 mL of pyridine is added 7.41 g (0.03 mole) of myristoyl chloride. After shaking overnight at ambient temperature the mixture is filtered, concentrated and refiltered through alumina to afford the title compound.

EXAMPLE 10

Trithioglycolated tris-hydroxymethylpropane triundec-10-enate (also called 1,1,1-tris(4-oxo-3-thiatetradec-13-enoyloxymethyl)propane), another thio ester derivative of this invention, is synthesized in this example.

To a solution of 3.56 g (0.01 mole) of trithioglycolated tris(hydroxymethyl)propane in 20 mL of pyridine was added 6.09 g (0.03 mole) of 10-undecenoyl chloride and the mixture shaken overnight at ambient temperature. Filtration, concentration and refiltration through alumina afforded the title compound.

EXAMPLE 11

This example summarizes the synthesis of trithioglycolated trishydroxymethylpropane trilaurate (also called 1,1,1-tris(4-oxo-3-thiapentadecanoyloxymethyl)propane).

To a solution of 3.56 g (0.01 mole) of trithioglycolated tris(hydroxymethyl)propane in 20 mL of pyridine is added 6.57 g (0.03 mole) of lauroyl chloride and the mixture shaken overnight at ambient temperature. Filtration, concentration and refiltration through alumina affords the title compound.

EXAMPLE 12

This example summarizes the preparation of trithioglycolated trishydroxymethylpropane tristearate (also called 1,1'-tris(4-oxo-3-thiahencosanoyloxymethyl)propane).

To a solution of 3.56 g (0.01 mole) of trithioglycolated tris(hydroxymethyl)propane in 20 mL of pyridine is added 9.09 g (0.03 mole) of stearoyl chloride and the mixture shaken overnight at ambient temperature. Filtration, concentration and refiltration through alumina affords the title compound.

EXAMPLE 13

This example illustrates the synthesis of trithioglycolated trishydroxymethylpropane trimyristate (also called 1,1,1-tris(4-oxo-3-thiaheptadecanoyloxymethyl)propane).

To a solution of 3.56 g (0.01 mole) of trithioglycolated tris(hydroxymethyl)propane in 20 mL of pyridine is added 7.41 g (0.03 mole) of myristoyl chloride, and the mixture shaken overnight at ambient temperature. Filtration, concentration and refiltration through alumina affords the title compound.

EXAMPLE 14

Another trithioglycolated derivative, trithioglycolated trishydroxymethylpropane tripalmitate (also called 1,1,1-tris(4-oxo-3-thianonadecanoyloxymethyl)propane), is synthesized in this example.

To a solution of 3.56 g (0.01 mole) of trithiglycolated tris(hydroxymethyl)propane in 20 mL of pyridine is added 8.25 g (0.03 mole) of palmitoyl chloride and the mixture shaken overnight at ambient temperature. Filtration, concentration and refiltration through alumina affords the title compound.

EXAMPLE 15

This example outlines the procedure for estimating the in vitro digestibility of the thioester derivatives of this invention.

Preparation of Reagents and Materials

1. Buffer: A pH 7.1 phosphate buffer is prepared by dissolving 6.8 g $KH_2PO_4$ in 1 L of millipore filtered water (to yield 0.05M phosphate). Fifty mg $Ca(NO_3)_2$ is added and 5.0 g cholic acid (Na salt, an ox bile isolate from Sigma) to give 0.3 mM $Ca^{++}$ and 0.5% cholic acid in 0.05M phosphate. The pH is adjusted to approximately 7.1 with solid NaOH. Several drops of Baker "Resi-analyzed" toluene are added to prevent bacterial growth during storage at 3°–5° C.

2. Lipase: About 15 mg./mL commercial porcine pancreatic lipase from U.S. Biochemical Corporation is dissolved in buffer.

3. Substrates and Standards: A 1.0 mL volumetric flask is charged with an amount of lipid substrate calculated to give a concentration of 200 nanomoles per microliter in Baker "Resianalyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions.

Fatty acids and glyceride standards from Nu Chek or Sigma are prepared for elution on thin layer chromatography (TLC) plates (prewashed with 1:1 v/v chloroform/methanol) by diluting the substrate solution with 10:1 v/v toluene (1 part substrate plus 9 parts toluene) in septum vials.

Procedure

In a 25 mL Erlenmeyer, emulsify 20 mL buffer and 40 microliters of substrate using an ultrasonic disrupter at a microtip maximum setting for approximately 10 seconds. This results in a 0.4 microliter/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, aliquots are taken at 10, 20, 30 and 40 minutes. A zero time control should be run for all test compounds.

Add the aliquot to a 15 mL glass centrifuge tube containing a drop of concentrated HCl. Add approximately 3 mL of a 2:1 v/v mixture of $CHCl_3:CH_3OH$ and shake vigorously. Centrifuge at approximately 5000 rpm for 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved. Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control, this amounts to 20 nanomoles of substrate spotted on the plate.) Develop with a suitable solvent system, for example, hexane: ethyl ether:chloroform:acetic acid in a volume ratio of 60:20:20:1. After 15 cm elution, dry plate with a heat gun and determine amounts of starting substrate and products of hydrolysis by scanning 10 to 20 nanomoles per channel at a wavelength of 190 nm using a CAMAG TLC Scanner II densitometer equipped with a Spectra Physics 4270 integrator and comparing with controls run at the same time.

Results

Using this procedure and enzyme system, triolein, a triglyceride control, is substantially hydrolyzed in 10 minutes. Under the same conditions, 1-thioglycerol trioleate synthesized in Example 1 is hydrolyzed 50% in three hours and 1,2-dithioglycerol trioleate synthesized in Example 2 is hydrolyzed 30 to 40% in three hours.

EXAMPLE 16

Sweet Chocolate. A low calorie sweet chocolate may be prepared by combining:

| Ingredient | parts |
| --- | --- |
| Cocoa Powder | 1.0 |
| Sugar | 1.0 |

To this is added a portion of

| | |
| --- | --- |
| Example 6 Thioester | 1.0 | and the ingredients are mixed thoroughly and passed through a refiner to reduce the particles to desired size. The material is conched, and the remaining thioester is added. The mixture is poured into molds and quench cooled. No tempering regimen is necessary.

Chocolate Chips. The chocolate prepared above may be melted and deposited into nibs in the usual process.

EXAMPLE 17

Sugar Cookies. Sugar cookies may be prepared by blending:

| Ingredient | parts |
| --- | --- |
| Sugar | 231 |
| Example 7 Thioester | 114 |
| Salt | 3.7 |
| Sodium Bicarbonate | 4.4 |
| Water | 37.4 |
| 5.9% Dextrose Solution (wt/wt) | 58.7 |
| Flour | 391 |

All of the ingredients are creamed together. The dough so formed may be extruded and baked by the usual process.

EXAMPLE 18

Margarine. Margarine may be prepared by combining the ingredients for the following two phases:

| | parts |
| --- | --- |
| Oil Phase Ingredients | |
| Example 1 Thioester | 59.0 |
| Soybean Hardstock (IV 65) | 40.0 |
| Emulsifier | 1.0 |
| Aqueous Phase Ingredients | |
| Water | 95.8 |
| Milk Solids | 2.0 |
| Salt | 2.0 |

-continued

| Ingredient | parts |
| --- | --- |
| Citric Acid | 0.1 |
| Beta Carotene | 0.1 |

The phases are emulsified in an oil:aqueous phase ratio of 80:20, and passed through a cool scraped surface heat exchanger in the usual process.

EXAMPLE 19

Flavor Bits. Flavor bits for incorporation into baked goods may be prepared by combining the following ingredients:

| Ingredient | parts |
| --- | --- |
| Sucrose | 215 |
| Water | 180 |
| Corn Syrup | 160 |
| Example 18 Margarine | 28 |
| Flavor | 12 |
| Citric Acid | 10 |
| Glycerine | 8 |
| Salt | 5 |
| Dye | 1 |

The first three ingredients are heated to 290° F. and the heat removed. Margarine is mixed in, and the mixture allowed to cool to 160°–170° F. before adding the remaining ingredients.
(Almost any flavoring material may be used as flavor, for example, butterscotch or nut.) The mixture is then poured into a cold aluminum pan and frozen in dry ice. The frozen mixture is then cracked and milled into bits.

EXAMPLE 20

Butterscotch Cookies: Butterscotch cookies may be prepared by blending:

| Ingredient | parts |
| --- | --- |
| Flour | 22.0 |
| Example 11 Thioester | 20.0 |
| Salt | 0.7 |
| Sodium Bicarbonate | 0.1 |
| Monocalcium Phosphate | 0.1 |
| Vanillin | 0.1 |
| Water | 8.0 | and mixing well. To this is added

| | |
| --- | --- |
| Sugar | 30.0 | which is mixed until dispersed. Then

| | |
| --- | --- |
| Example 19 Butterscotch Bits | 19.0 | are added and mixed until just blended prior to depositing and baking by the usual process.

EXAMPLE 21

Vanilla Wafers.
Combine and mix well:

| Ingredient | parts |
| --- | --- |
| Flour | 40 |

-continued

| Ingredient | parts |
| --- | --- |
| Sugar (10X) | 28 |
| Example 2 Thioester | 13 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 |

Aerate, deposit onto a baking surface and bake in the usual manner.

EXAMPLE 22

Chocolate Chip Cookies. Chocolate chip cookies may be prepared using the butterscotch cookie recipe of Example 20, but substituting

| Ingredient | parts |
| --- | --- |
| Example 18 Margarine | 10.0 |
| Example 13 Thioester | 10.0 | for the fat mimetic ingredient,

| | |
| --- | --- |
| Granulated Sugar | 15.0 |
| Brown Sugar | 15.0 | for the sugar, and

| | |
| --- | --- |
| Example 16 Chocolate Chips | 19.0 | for the butterscotch bits.

EXAMPLE 23

Filled Cream. To make a "filled cream" composition, homogenize about

| Ingredient | parts |
| --- | --- |
| Example 2 Thioester | 30 |
| Skim Milk | 69.9 |
| Polysorbate 80 | 0.1 | in a conventional dairy homogenizer.

EXAMPLE 24

Ice Cream. Vanilla ice cream may be prepared by mixing

| Ingredient | parts |
| --- | --- |
| Sugar (10X) | 15.0 |
| Nonfat Dry Milk | 3.9 |
| Salt | 0.4 |
| into Water | 39.0 | for 3 minutes. Then add melted

| | |
| --- | --- |
| Example 12 Thioester | 28.4 | and cook to 200° F. while mixing. Hold for 1 minute. Cool to 160° F., and add

| | |
|---|---|
| Sugared Egg Yolks | 12.5 |
| Vanilla Extract | 0.8 | and mix 1 minute. Cool and freeze to desired overrun.

EXAMPLE 25

Filled Milk. To prepare a "filled milk" composition, combine about

| Ingredient | parts |
|---|---|
| Example 23 Filled Cream | 100 |
| Skim Milk | 900 | and rehomogenize.

EXAMPLE 26

Cheese Products. To prepare cheese products, treat

Ingredient

Example 25 Filled Milk
made with a 1:1 mixture of Examples 4 and 10 thioesters is used like natural milk in the normal cheese making process (as is practiced, for example in the production of Cheddar or Swiss cheese). Preferably add

| | parts |
|---|---|
| Butter Oil | 10 | to the fat mimetic portion of the filled milk product before it is employed in this process to enhance the proper flavor development of the cheese products.

EXAMPLE 27

Butter Cream Icing. Butter cream icing may be prepared by blending:

| Ingredient | parts |
|---|---|
| Sugar | 227.0 |
| Example 10 Thioester | 70.8 |
| Water | 28.4 |
| Nonfat Dry Milk | 14.0 |
| Emulsifier | 1.4 |
| Salt | 1.0 |
| Vanilla | 1.0 |

All of the ingredients are creamed in a mixer at medium speed.

EXAMPLE 28

Crackers. A dough prepared by mixing together

| Ingredient | parts |
|---|---|
| Flour | 100 |
| Sugar | 5.0 |
| Malt | 1.5 |
| Example 8 Thioester | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product.

EXAMPLE 29

Sprayed Crackers. The sheeted and stamped cracker dough of Example 28 may be sprayed with the thioester of Example 1 after baking.

EXAMPLE 30

Mayonnaise. Mayonnaise can be prepared by adding

| Ingredient | parts |
|---|---|
| Water | 5.0 |
| to Sugar | 1.5 |
| and Spices | 3.5 | and mixing three minutes. To this is added

| | |
|---|---|
| Salted Egg Yolks | 8.0 | followed by mixing two minutes, and adding

| | |
|---|---|
| Example 1 Thioester | 40 |
| and Corn Oil | 40 |
| then 120 Distilled Vinegar | 2.0 |

The mixture is blended 3 minutes and passed through a colloid mill set at 60 prior to filling in the usual process.

EXAMPLE 31

Pudding. Pudding can be prepared from the following formulation:

| Ingredient | parts |
|---|---|
| Milk | 67 |
| Sugar | 11 |
| Starch | 5 |
| Water | 9 |
| Flavor | 3 |
| Example 10 Thioester | 5 |

The ingredients can be blended together and heated to form a pudding.

EXAMPLE 32

Frying Oil. The thioester of Example 14 with 1 ppm polydimethylsiloxane may be used for frying food snacks. For frying potatoes, omit the polydimethylsiloxane.

EXAMPLE 33

Frying Oil. Another frying oil may be prepared by mixing one part frying oil of Example 32 with one part peanut oil.

EXAMPLE 34

Pet Food. Dry, expanded animal food kibs may be prepared from the following ingredients:

| Ingredient | parts |
|---|---|
| Hominy Feed | 37 |
| 52% Meat Meal | 17 |
| Wheat Shorts | 13 |
| Example 13 Thioester | 16 |

| Ingredient | parts |
| --- | --- |
| Corn Germ Meal | 9.6 |
| Wheat Germ Meal | 3 |
| Dried Milk | 0.9 |
| Beet Pulp | 1.7 |
| Fish Scrap | 0.5 |
| Brewer's Yeast | 0.5 |
| Salt | 0.5 |
| Vitamins and Minerals | 0.1 |

The ingredients are mixed together and water added to raise the water content to 27%, before extrusion, pelleting, and drying in the usual manner.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food composition comprising food ingredients and an edible fat mimetic compound of the following formula:

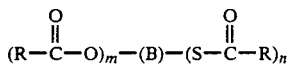

wherein:

B is a linear or branched alkyl backbone having from 2 to 6 carbons,
m = 1 to 6,
n = 0 to 3, and
each R is, independently, a $C_1$ to $C_{29}$ aliphatic group, a $C_2$ to $C_{29}$ either group of the formula R′—O—R″—, a $C_2$ to $C_{29}$ ester group of the formula R′—O—(CO)—R″— or R′—(CO)—O—R″—, or a $C_2$ to $C_{29}$ thioester group of the formula R″—(CO)—S—R′— or R″—S—(CO)—R′—, where R′— and R″— are, independently, aliphatic groups, with the proviso that $m+n \geq 2$ and that each compound has at least one thioester bond.

2. The composition according to claim 1 wherein $m+n=3$.

3. The composition according to claim 2 wherein $n=0$ and at least one R is a thioester group.

4. The composition according to claim 2 wherein the R groups are aliphatic groups.

5. The composition according to claim 1 wherein the R groups have 3 to 23 carbons.

6. The composition according to claim 1 wherein said R groups derived from fatty acids selected from the group consisting of acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids, and mixtures thereof.

7. The composition according to claim 1 wherein the R groups are derived from non-hydrogenated, partially hydrogenated and fully hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, butter and marine oils, and fractions thereof.

8. A low-calorie fat-containing food composition comprising non-fat ingredients and fat ingredients, wherein all or part of the fat ingredients are replaced with a fat composition comprising a two- to six-carbon backbone to which is attached at least one $C_1$ to $C_{29}$ aliphatic or $C_2$ to $C_{29}$ ether or ester group in ester linkage and at least one second $C_1$ to $C_{29}$ aliphatic or $C_2$ to $C_{29}$ ether or ester group in thioester linkage.

9. A low-calorie fat-containing food composition comprising non-fat ingredients and fat ingredients, wherein all or part of the fat ingredients are replaced with a fat composition comprising a two- to six- carbon backbone to which is attached at least one $C_1$ to $C_{29}$ aliphatic or $C_2$ to $C_{29}$ thioester group in ester linkage.

10. A food composition comprising, in addition to other edible materials, a fat ingredient having at least two $C_2$ to $C_{29}$ aliphatic, ether or ester groups esterified to a thiol selected from the group consisting of thioglycol, thioglycerol, mercaptobutanol, dimercaptobutanol, dimercaptobutanediol, mercaptobutanediol, mercaptopentanol, mercaptopentanediol, dimercaptopentanol, dimercaptopentanediol, mercaptohexanol, mercaptohexanediol, dimercaptohexanol, dimercaptohexanediol, and thiosorbitol.

11. The composition according to claim 10 wherein said thiol is thioglycerol.

12. The composition according to claims 8 or 10 wherein all said attached or esterified groups are aliphatic.

13. The composition according to claims 9 to 11 wherein all said attached groups comprise those having 3 to 23 carbons.

14. A food composition comprising, in addition to other edible materials, a fat ingredient having at least two $C_2$ to $C_{29}$ thioester groups esterified to a polyol selected form the group consisting of glycol, glycerol, butanediol, butanetriol, butanetetrol, trihydroxymethylethane, trishydroxymethylpropane, pentaerythritol, pentanediol, pentanetriol, pentanetetrol, hexanediol, hexanetriol, hexanetetrol, and sorbitol.

15. The composition of claim 14 wherein said polyol is tris hydroxynmethylpropane.

16. The composition according to claims 8 to 10 or 14 wherein said attached or esterified groups have 15 to 17 carbons.

17. The composition according to claims 8 to 10 or 14 wherein said attached or esterified groups are derived from fatty acids selected from the group consisting of acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids and mixtures thereof.

18. The composition according to claims 8 to 10 or 14 wherein said attached groups are derived from non-hydrognated, partially hydrogenated and fully hydrogenated oils selected from the group consisting of soybean, safflower, sunflower, sesame, peanut, corn, olive, rice, ban, canola, babassu nut, coconut, palm, palm kernel, lupin, nasturtium seed, mustard seed, cottonseed, low erucic rapeseed, butter and marine oils, and fractions thereof.

19. A method for reducing the available calories in a food composition having an edible oil component, which method consists of replacing at least a substantial portion of the edible oil with a compound of the formula:

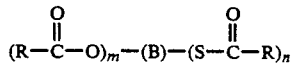

where:
B is a linear or branched alkyl backbone having from 2 to 6 carbons,
m=1 to 6,
n=0 to 3, and
each R is, independently, a $C_1$ to $C_{29}$ aliphatic group, a $C_2$ to $C_{29}$ ether group of the formula R'—O—R"—, a $C_2$ to $C_{29}$ ester group of the formula R'—O—(CO)—R"— or R'—(CO)—O—R"—, or a $C_2$ to $C_{29}$ thioester group of the formula R"—(CO)—S—R'— or R"—S—(CO)—R'—, where R'— and R"— are, independently, aliphatic groups, with the proviso that $m+n \geq 2$ and that each compound has at least one thioester bond.

20. The method of claim 19 wherein $m+n=3$ and every R is an aliphatic $C_3$ to $C_{23}$ group.

21. The method of claim 19 wherein $m+n=3$, at least one R is a thioester group, and every R has 3 to 23 carbons.

22. The method of claim 19 wherein said compound delivers between 0.5 to 8.5 kcal/gram upon being metabolized.

23. A method of preparing a food composition containing an edible fat ingredient comprising incorporating a compound of the formula:

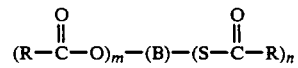

wherein:
B is a linear or branched alkyl backbone having from 2 to 6 carbons,
m=1 to 6,
n=0 to 3, and
each R is, independently, a $C_1$ to $C_{29}$ aliphatic group, a $C_2$ to $C_{29}$ ether group of the formula R'—O—R"—, a $C_2$ to $C_{29}$ ester group of the formula R'—O—(CO)—R"— or R'—(CO)—O—R"—, or a $C_2$ to $C_{29}$ thioester group of the formula R"—(CO)—S—R'— or R"—S—(CO)—R'—, where R'— and R"— are, independently, aliphatic groups, with the proviso that $m+n \geq 2$ and each compound has at least one thioester bond, in full or partial replacement of said edible fat ingredient.

24. The method of claim 23 wherein said compound is partially digestible.

25. The composition of claim 23 wherein said food method comprises a cookie.

26. The method of claim 25 wherein said cookie further comprises flour, sugar, frozen whole eggs, vanilla, salt, sodium bicarbonate, sodium aluminum phosphate, ammonium bicarbonate, high fructose corn syrup, and water.

27. The method of claim 25 wherein said cookie further comprises salt, sodium bicarbonate, monocalcium phosphate, vanillin, water, and sugar.

28. The method of claim 27 wherein said cookie further comprises chocolate chips, margarine, and brown sugar.

29. The method of claim 27 wherein said cookie further comprises butterscotch bits.

30. The method of claim 25 wherein said cookie further comprises flour, sugar, salt, sodium bicarbonate, and water.

31. The method of claim 23 wherein said food composition comprises a cracker.

32. The method of claim 31 wherein said cracker further comprises flour, sugar, malt, sodium bicarbonate, nonfat dry milk, high fructose corn syrup, monocalcium phosphate, and water.

33. The method of claim 23 wherein said food composition comprises a dairy product selected from the group consisting of filled milk, filled cream, ice cream, and cheese.

34. The method of claim 33 wherein said filled milk and filled cream further comprise skim milk.

35. The method of claim 33 wherein said ice cream further comprises skim milk, sugar, gelatin, flavor, and color.

36. The method of claim 23 wherein said food composition comprises a frying oil.

37. The method of claim 36 wherein said frying oil further comprises peanut oil.

38. The method of claim 23 wherein said food composition comprises margarine.

39. The method of claim 38 wherein said margarine further comprises soybean hardstock, emulsifier, water, milk solids, salt, citric acid, and beta carotene.

40. The method of claim 23 wherein said food composition comprises pudding.

41. The method of claim 40 wherein said pudding further comprises milk, sugar, starch, water and flavor.

42. The method of claim 23 wherein said food composition is a pet food further comprising hominy feed, meat meal, wheat shorts, corn germ meal, wheat germ meal, dried milk, beet pulp, brewer's yeast, and salt.

43. The method of claim 23 wherein said food composition comprises mayonnaise.

44. The method of claim 43 wherein said mayonnaise further comprises corn oil, salted egg yolks, vinegar and water.

45. The method of claim 23 wherein said food composition comprises chocolate.

46. The method of claim 45 wherein said chocolate further comprises cocoa powder and sugar.

47. The method of claim 23 wherein said food composition comprises a butter cream icing.

48. The method of claim 47 wherein said butter cream icing further comprises sugar, water, nonfat dry milk, emulsifier, salt, and vanilla.

49. In a food composition, containing a digestible fat ingredient an improvement wherein at least a portion of the digestible fat ingredient is replaced by a thioester derivative comprising a 2- to 6-carbon backbone to which is attached at least two fatty acids, one in ester linkage and one in thioester linkage.

50. The improvement of claim 49 wherein said fatty acids are $C_4$ to $C_{24}$ fatty acids.

51. In a food composition, containing a digestible fat ingredient an improvement wherein at least a portion of the digestible fat ingredient is replaced by a thioester derivative comprising a 2- to 6-carbon backbone to which is esterified at least two $C_3$ to $C_{23}$ thioester groups.

52. The improvement of claim 51 wherein said 2- to 6-carbon backbone is a neoalkyl.

* * * * *